United States Patent
Tyler

(10) Patent No.: US 9,875,478 B1
(45) Date of Patent: Jan. 23, 2018

(54) SYSTEM AND METHOD FOR LEVERAGING LOCATION TO ENHANCE BANKING SERVICES

(75) Inventor: Timothy N. Tyler, Crowborough (GB)

(73) Assignee: Misys International Banking Systems Limited, London (GB)

( * ) Notice: Subject to any disclaimer, the term of this patent is extended or adjusted under 35 U.S.C. 154(b) by 589 days.

(21) Appl. No.: 13/296,157

(22) Filed: Nov. 14, 2011

Related U.S. Application Data

(60) Provisional application No. 61/498,452, filed on Jun. 17, 2011.

(51) Int. Cl.
*G06Q 20/00* (2012.01)
*G06Q 30/00* (2012.01)
*G06Q 30/02* (2012.01)
*G06Q 40/00* (2012.01)

(52) U.S. Cl.
CPC .............. *G06Q 30/00* (2013.01); *G06Q 30/02* (2013.01); *G06Q 30/0233* (2013.01); *G06Q 40/00* (2013.01)

(58) Field of Classification Search
CPC .............. G06Q 30/0222; G06Q 30/02; G06Q 30/0233; G06Q 30/0601; G06Q 30/0613; G06Q 20/10; G06Q 20/40
USPC .... 705/14.23, 14.33, 24, 26.41, 26.1, 39, 44
See application file for complete search history.

(56) References Cited

U.S. PATENT DOCUMENTS

| | | | | |
|---|---|---|---|---|
| 7,269,426 B2* | 9/2007 | Kokkonen | ............ | H04L 63/101 455/411 |
| 7,359,938 B1* | 4/2008 | Davies | .............. | H04M 3/42008 709/204 |
| 7,603,411 B1* | 10/2009 | Davies | .................... | H04L 29/06 370/349 |
| 7,949,730 B2* | 5/2011 | Rensin | .............. | H04L 29/06027 341/176 |
| 8,274,897 B1* | 9/2012 | Pons | .................. | G01C 21/3415 370/238 |
| 2003/0023726 A1* | 1/2003 | Rice | ......................... | H04W 8/16 709/225 |
| 2005/0075116 A1* | 4/2005 | Laird | ....................... | A61B 5/04 455/456.3 |
| 2008/0041942 A1* | 2/2008 | Aissa | ................. | G06K 9/00087 235/382 |
| 2008/0235230 A1* | 9/2008 | Maes | .................... | H04M 7/006 |
| 2009/0216633 A1* | 8/2009 | Whitsett | ................ | G06Q 30/02 705/14.36 |

(Continued)

*Primary Examiner* — Olusegun Goyea
(74) *Attorney, Agent, or Firm* — Sheppard Mullin Richter & Hampton LLP

(57) ABSTRACT

Methods, machine-readable media, apparatuses and systems are provided to provide an application platform that provides the ability to track and report the location of customers of various organizations such as retailers, banks and other service organizations. In one embodiment, customers' locations are tracked via automatic check-in with a centralized location service via channels of such organizations such as corporate websites, ATMs, POS terminals and so forth. In one embodiment, customers' locations are tracked via third-party websites such as social networking websites via manual and/or automated check-in with check-in facilities on such websites. Organizations, with appropriate, permissions can then inquire on, inter alia, customers' last known location.

10 Claims, 7 Drawing Sheets

(56) References Cited

U.S. PATENT DOCUMENTS

| | | | | |
|---|---|---|---|---|
| 2009/0291672 A1* | 11/2009 | Treves | ................ | G06F 17/3087 455/414.1 |
| 2009/0313358 A1* | 12/2009 | Shepherd | ............ | H04L 41/5054 709/221 |
| 2010/0009657 A1* | 1/2010 | Dingler | ................... | H04W 4/02 455/411 |
| 2010/0024045 A1* | 1/2010 | Sastry | ................ | G06F 21/6245 726/28 |
| 2010/0030592 A1* | 2/2010 | Evans | ................ | G06K 7/1095 705/5 |
| 2010/0042519 A1* | 2/2010 | Dingler | ................ | G01S 5/0009 705/30 |
| 2010/0075648 A1* | 3/2010 | Matsuoka | ......... | H04M 1/72566 455/418 |
| 2010/0235218 A1* | 9/2010 | Erhart | ................... | G06Q 10/06 705/7.34 |
| 2011/0045801 A1* | 2/2011 | Parker, II | ......... | H04M 1/72538 455/411 |
| 2011/0252095 A1* | 10/2011 | Cypes | ................ | G06Q 10/107 709/205 |
| 2011/0289433 A1* | 11/2011 | Whalin | ............. | G06F 17/30964 715/753 |
| 2012/0088487 A1* | 4/2012 | Khan | .................... | H04W 4/001 455/418 |
| 2012/0095790 A1* | 4/2012 | Stefik | ................... | G06Q 10/02 705/5 |
| 2012/0109696 A1* | 5/2012 | Kaiser | ................... | G06Q 10/02 705/5 |
| 2012/0164982 A1* | 6/2012 | Klein | ..................... | G07C 13/00 455/411 |
| 2012/0197709 A1* | 8/2012 | Kendall | ............. | G06Q 30/0207 705/14.36 |
| 2012/0208549 A1* | 8/2012 | Lau | ........................ | G01S 5/02 455/456.1 |
| 2012/0208550 A1* | 8/2012 | Proietti | ................ | G01S 5/0027 455/456.1 |
| 2012/0209685 A1* | 8/2012 | Nealer | ............... | G06Q 30/0207 705/14.25 |
| 2012/0209744 A1* | 8/2012 | Mullen | ............. | G06Q 30/0641 705/26.41 |
| 2012/0221437 A1* | 8/2012 | Yoo | ..................... | G06Q 10/107 705/26.41 |
| 2012/0233158 A1* | 9/2012 | Braginsky | .............. | H04L 67/18 707/724 |
| 2012/0239479 A1* | 9/2012 | Amaro | ................ | G06Q 20/102 705/14.23 |
| 2012/0245990 A1* | 9/2012 | Agarwal | ............ | G06Q 30/0202 705/14.25 |
| 2012/0246004 A1* | 9/2012 | Book | ..................... | G06Q 30/02 705/14.58 |
| 2012/0254037 A1* | 10/2012 | Mullen | ............. | G06Q 20/3552 705/44 |
| 2012/0278154 A1* | 11/2012 | Lange | ................... | G06Q 30/02 705/14.24 |
| 2012/0304265 A1* | 11/2012 | Richter | ................. | G06Q 10/00 726/7 |
| 2012/0316950 A1* | 12/2012 | LaPorte | ............ | G06Q 20/3276 705/14.33 |

\* cited by examiner

SYSTEM AND METHOD FOR LEVERAGING LOCATION TO ENHANCE BANKING SERVICES

CROSS-REFERENCE TO RELATED APPLICATIONS

This application claims the benefit of U.S. provisional patent application No. 61/498,452, filed Jun. 17, 2011 and entitled "System and Method for Leveraging Location to Enhance Banking Services," which is incorporated by reference herein in its entirety.

BACKGROUND

Field

At least some embodiments of the disclosure relate generally to the field of systems that can track the location of users and provide such information to interested parties.

Description of the Related Art

Banking and other types of financial services are frequently provided over wide geographical areas. Such services are typically accessed by users via devices co-located with the user. If a financial transaction (e.g., a withdrawal or a purchase) is initiated at a device located remote from the user's last known location, it can indicate that the transaction is fraudulent. Building a view of a user's location over time can provide useful information to service providers to enable the service providers to identify, inter alia, suspicious transactions.

BRIEF DESCRIPTION OF THE DRAWINGS

These and other features, aspects, and advantages will become better understood with regard to the following description, appended claims, and accompanying drawings where:

DETAILED DESCRIPTION

Figure 1:
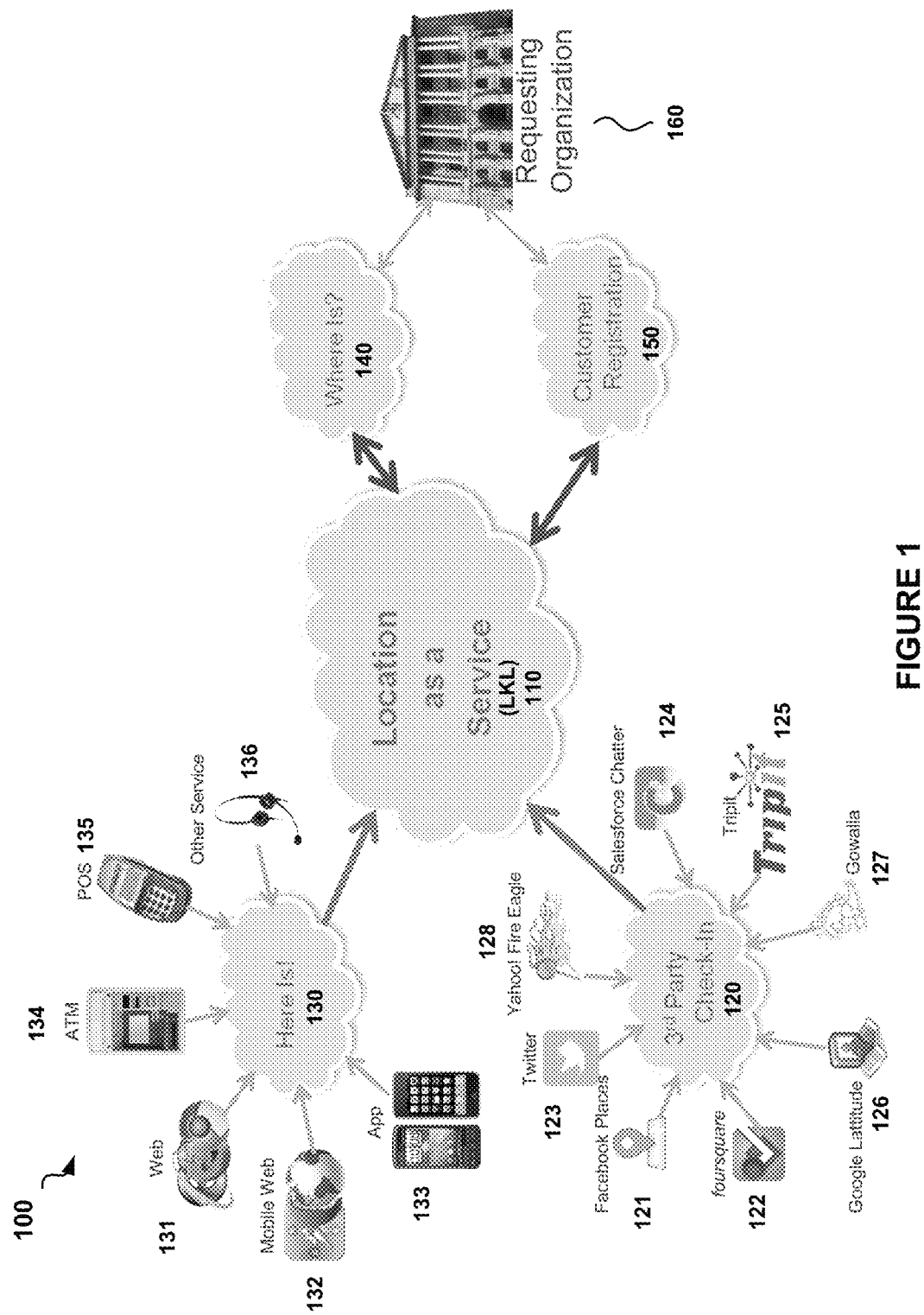
FIG. 1 illustrates a high-level conceptual view of one embodiment of a system for providing location as a service.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment, and such references mean at least one.

Reference in this specification to "one embodiment" or "an embodiment" or "some embodiments" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that can be exhibited by some embodiments and not by others. Similarly, various requirements are described that can be requirements for some embodiments, but not other embodiments.

Features of embodiments that are herein expressly or impliedly described as one of methods, machine-readable media, apparatuses, or systems should be understood to also describe the other of methods, machine-readable media, apparatuses, or systems. For example, embodiments describing features of an apparatus or system should be understood to also describe a method involving the features and a machine-readable media involving the features.

For the purposes of this disclosure, the term "server", in one embodiment, should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software that support the services provided by the server.

For the purposes of this disclosure, machine-readable media stores computer data, which data can include computer program code that is executable by a computer, in machine-readable form. By way of example and not limitation, computer-readable medium can comprise non-transitory, computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information, such as computer-readable instructions, data structures, program modules or other data. Computer-readable storage media includes, but is not limited to, RAM, ROM, EPROM, EEPROM, flash memory or other solid state memory technology; CD-ROM, DVD, or other optical storage; magnetic cassettes, magnetic tape, magnetic disk storage or other magnetic storage devices; or any other physical or material medium that can be used to tangibly store the desired information or data or instructions and that can be accessed by a computer or processor.

For the purposes of this disclosure, the term "customer" should be understood to refer to users, which may be natural persons or any other type of entity whose location can vary over time, who are customers of organizations providing goods and/or services, or who otherwise provide location information to location services as described herein.

For the purposes of this disclosure, the term "organization" should be understood to refer to entities that supply goods and/or services (such as, for example, banking or retailing services) to customers, or who otherwise obtain location information relating to customers via a location service as described herein. For the purposes of this disclosure, the term "requesting organization" should be understood to refer an organization that requests location data relating to its customers from a location service.

For the purposes of this disclosure, the term "channel" should be understood to refer to a communication channel through which an organization can receive location data relating to its customers. Such channels should be understood broadly to refer not only data transmission facilities, but also to various other hardware, software and/or network components through which location data is obtained. For example, an ATM network can be considered one type of channel and such channel can be regarded as including ATM terminals, network components that connect the ATM components to a network of one or more servers, and centralized data processing facilities that receive, process and store data received or retrieved from ATM terminals.

This disclosure generally relates to various embodiments of systems and methods that provide customers' locations as a service to interested parties. In one embodiment the locations as a service is a service for banks and other organizations (hereinafter referred to as "requesting organizations") to track and request the last known geographic location (hereinafter referred to as "last known location" or "LKL") of a specific customer or other user.

FIG. 1 illustrates a high-level conceptual view of one embodiment of a system 100 for providing location as a service.

In one embodiment, location as a service 110 can be provided as a centralized, hosted service accessible via the Internet, hereinafter referred to as the LKL service. Multiple location services can be defined on the LKL service. Each such LKL service enables requesting organizations 160 interested in their customers' location to record and inquire on their customers' locations, for example, a customer's last known location.

In one embodiment, at least some location services utilize one or more of a requesting organization's 160 existing communications channels to obtain and provide location data for the requesting organization's 160 customers. In one embodiment such existing channels could include web-based channels 131 and 132 (e.g., the requesting organization's 160 websites), apps hosted on customer devices 133 (e.g., smart phone type devices), ATMs 134, POS terminals 135 and/or any other services offered by requesting organizations 136 (e.g., call-in customer service centers, inter alia).

In one embodiment, at least some location services utilize one or more third-party web-based services to obtain and provide location data for customers of one or more requesting organizations 160. In one embodiment, third-party web-based services could include any websites supporting facilities by which users can post a status message or otherwise identify their location. For example, such websites could include social media websites such as, for example, FACEBOOK PLACES 121, FOURSQUARE 122, TWITTER 123, SALESFORCE CHATTER 124, TRIPIT 125, GOOGLE LATTITUDE 126, GOWALLA 127 and/or YAHOO! FIRE EAGLE 128.

In one embodiment, a customer's location information can be provided directly by a requesting organization 160 to a location service associated with one or more of the requesting organization's channels 131-136 via direct check-in ("Here Is") services 130. For example, the location of a customer of a requesting organization 160 could be identified when the customer utilizes an ATM 134 of the requesting organization 160. The customer could then be automatically checked-in with a location service associated with the ATM channel 134 via facilities provided by the ATM channel 134 or other facilities of the requesting organization 160, having access to data flowing through the ATM channel 134.

In one embodiment, a customer's location information can be provided indirectly (i.e., not by a requesting organization 160) to a location service via third-party check-in services 120, which utilize one or more third-party web-based services 121-128. For example, the location of a customer of a requesting organization 160 could be identified when the customer signs into the TWITTER 123 social networking website and explicitly declares his or her location. The TWITTER 123 social networking website could then push the location information to the location service via third-party check-in services 120 provided by the location service.

The location services implemented on the LKL service 110 thus, in one embodiment provides location aggregation services, whereby regardless of where or how a user checks in, their location can be made available to a requesting organization 160 (subject to customer granted permissions).

In one embodiment, customers are initially registered with location services defined on the LKL service 110 by requesting organizations 160 via customer registration services 150 provided via the location service. In one embodiment, a location service only accepts either registration or de-registration instructions from a requesting organization 160.

Figure 2:
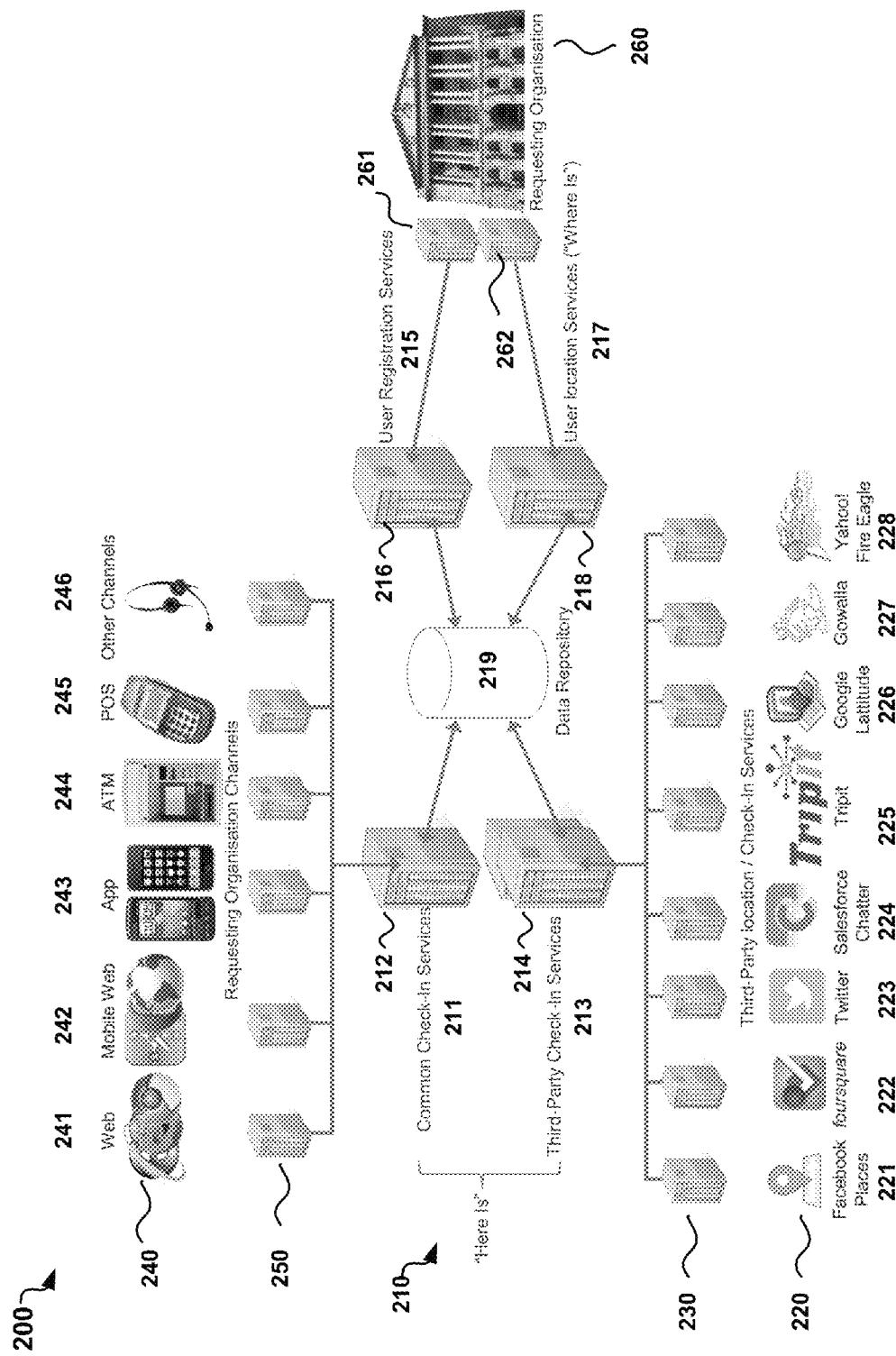
FIG. 2 illustrates an embodiment of a high-level view of an implementation of a system for providing location as a service.

FIG. 2 illustrates an embodiment of a high-level view of an implementation of a system 200 for providing location as a service.

In one embodiment, the LKL service 210 is hosted on one or more servers 212, 214, 216 and 218. Such services include direct check-in services 211 hosted on one or more servers, third-party (indirect) check-in services 213 hosted on one or more servers 214, user registration services 215 hosted on one or more servers 216 and user location ("Where Is") services 217 hosted on one or more servers 218. Location data and data related to the provision of location services (e.g., the definition of individual location services) is stored on one or more data repositories 219 accessible to the servers 212, 214, 216 and 218.

The servers 212, 214, 216 and 218 and the data repository could in various embodiments be maintained by an LKL service provider in one or more physical locations controlled by the LKL service provider and/or by various third-party facilities providers. In various embodiments, the servers 212, 214, 216 and 218 supporting the LKL service's development and delivery mechanisms could be provided by a cloud-based, hosted infrastructure such as that provided by, for example, the FORCE.COM cloud-based application platform.

In one embodiment, direct check-in services 212 are provided via channels 240 hosted on servers 250 and/or other service facilities maintained by requesting organizations 260 and/or third-party service providers. Such channels could include web-based channels 241 and 242 (e.g., the requesting organizations' 260 websites), apps hosted on customer devices 243 (e.g., smart phone type devices), ATMs 244, POS terminals 245 and/or any other services offered by requesting organizations 246 (e.g., call-in customer service centers, inter alia). In one embodiment, the servers 250 are accessible, via a network such as the Internet, to servers 212 supporting direct check-in services 211.

In one embodiment, third party (indirect) check-in services 213 are provided via third party websites 220 hosted on servers 230 and/or other service facilities maintained by such third-party websites. Such third-party websites could include any websites supporting a mechanism by which users can post a status message or otherwise identify their location. For example, such websites could include social media websites such as, for example, FACEBOOK PLACES 221, FOURSQUARE 222, TWITTER 223, SALESFORCE CHATTER 224, TRIPIT 225, GOOGLE LATTITUDE 226, GOWALLA 227 and/or YAHOO! FIRE EAGLE 228. In one embodiment, the servers 230 are accessible, via a network such as the Internet, to servers 214 supporting direct check-in services 211.

In one embodiment, user (customer) registration services 215 and user (customer) location ("Where Is") services 217 are accessed by requesting organizations via servers 261 and 262 maintained and/or controlled by such requesting organizations 260. In one embodiment, the servers 261 and 262 are connected via a network, such as the Internet, to servers 216 and 218 supporting user (customer) registration services 215 and user (customer) location ("Where Is") services 217. In one embodiment, requesting organizations 260 access user registration services 215 and user location ("Where Is") services 217 through the requesting organization's 260 channels 241-246.

In one embodiment, interfaces provided for check-in functions (whether direct or indirect) can be designed to render on a mobile browser or a desktop browser. In one embodiment, all other content can be designed to render within a desktop browser. In one embodiment, testing can be undertaken using a WEBKIT-based browser, for both mobile and desktop environments. In one embodiment, all web-based content can be HTML 5 compliant. In one embodiment, the default language for all delivered content can be set to a specific language, for example, EN-GB, although the service can accept input/display in any language/valid character set.

In one embodiment, all data held within the location service can be viewable and maintainable via direct access to the data within the system's host environment. Data held within the system, which can run within an alternative application server environment, can also be directly accessible for support and demonstration purposes.

Some of the principles and terminology referenced herein can refer to geo-services and map services defined or provided by certain companies. These services are illustrative, and the services of other companies can also be considered and used.

Location Service Registration and Administration

In one embodiment, location services associated with the LKL service can be defined via facilities provided by the LKL service. Information used to define a location service can include one or more of:

Location service name.
URL endpoints for the location service (e.g., a URL through which the service is accessed and data is sent and retrieved).
API keys for accessing the location service.

In one embodiment, location services can be defined that utilize requesting organizations' 260 channels, and thus enable such requesting organizations 260 to provide location information directly to location services. In one embodiment, in order to allow requesting organizations to identify such location services, an external name for the location service (LS-EXTERNAL-NAME) can be recorded. In one embodiment, location services utilizing a requesting organization's 260 channels are defined by system administrators employed by the LKL service and/or requesting organizations.

In one embodiment, location services can be defined that utilize third-party web-based services (e.g., social networking websites), and enable customers of multiple requesting organizations 260 to provide location information indirectly to such organization via the third-party web-based services.

In one embodiment, the LKL service 210 can provide an LKL "console" that is accessible over the Internet by LKL service 210 system administrators employed by the LKL service and/or requesting organizations. In one embodiment, all information entered within a location service registration is maintainable via the LKL console. In one embodiment, the LKL console can enable queries of check-in ("Here Is") history. In one embodiment, the LKL service 210 can provide more complex reporting via the LKL console by way of custom reports using a reporting tool such as, for example, the reporting tools provided by the FORCE.COM platform. Such reporting could include, for example:

Reports to allow systems administrators to view information such as last successful "Here Is" that a location service provided, as well as the ability to view historical "Here Is" information.
Reports showing requesting organizations that have permission to access information provided by a location service.
Reports showing users that are linked to a location service with the last date/time that each user was updated by that service.

Requesting Organization Registration

In one embodiment, any requesting organization 260 wishing to access services provided by an LKL service 210 provider registers with the LKL service 210 provider before being given access to location services. In one embodiment, during the registration process, licensing information relating to the requesting organization can be recorded such as, for example, licensed users. In one embodiment, for the purposes of testing, the LKL service 210 can provide the ability to indicate whether a requesting organization 260 is active or not—when not active the requesting organization 260 is unable to make calls to customer registration or customer location ("Where Is") web-services provided by location services.

In one embodiment, the LKL service 210 has the ability to record the requesting organization 260, including the ability to generate a key that the requesting organization uses when it accesses any of the LKL service's 210 web-services. In addition, other specific parameters recorded can include:

Requesting Organization Name
RO Short Name (Mnemonic for requesting organization 260)
RO Active (Granted permission to the service or not)
RO API Key (for web-service access)
RO-MAX-SPEED: an array of MINIMUM-DISTANCE and MAX-SPEED, used in velocity calculations.

In one embodiment, during the registration process, permission is granted between the requesting organization 260 and each location service 210 they wish to access. In one embodiment, the requesting organization is provided an API key to access the LKL service. In one embodiment, a requesting organization is automatically granted permission to use all location services provided through that requesting organization's channels. In one embodiment, a requesting organization must be approved by a third-party web service before the requesting organization is granted permission to use location services provided through such third party's web services. In one embodiment, a requesting organization can be granted permission to use location services provided via another requesting organization's channels. In one embodiment, if a requesting organization is granted permission to use a location service relating to a third-party website or another requesting organization, the requesting organization is provided the API key for that location service directly from the third party or other requesting organization.

In one embodiment, all parameters defined during a requesting organization's 260 registration can be maintainable via the LKL console by system administrators of the LKL service 210. In one embodiment, the LKL service 210 can provide facilities to view parameters defined at registration, to view specific usage statistics relating to a requesting organization. This could include, for example, "Where Is" request statistics—e.g., a historical query of all stored "Where Is" queries made by the requesting organization 260, with the ability to view both the query and the returned result.

In one embodiment, third parties, such as social networking websites, that wish to offer check-in services are registered with the LKL service. In one embodiment, requesting organizations can additionally provide third-party check-in services for other requesting organizations.

Customer Registration

Figure 3:
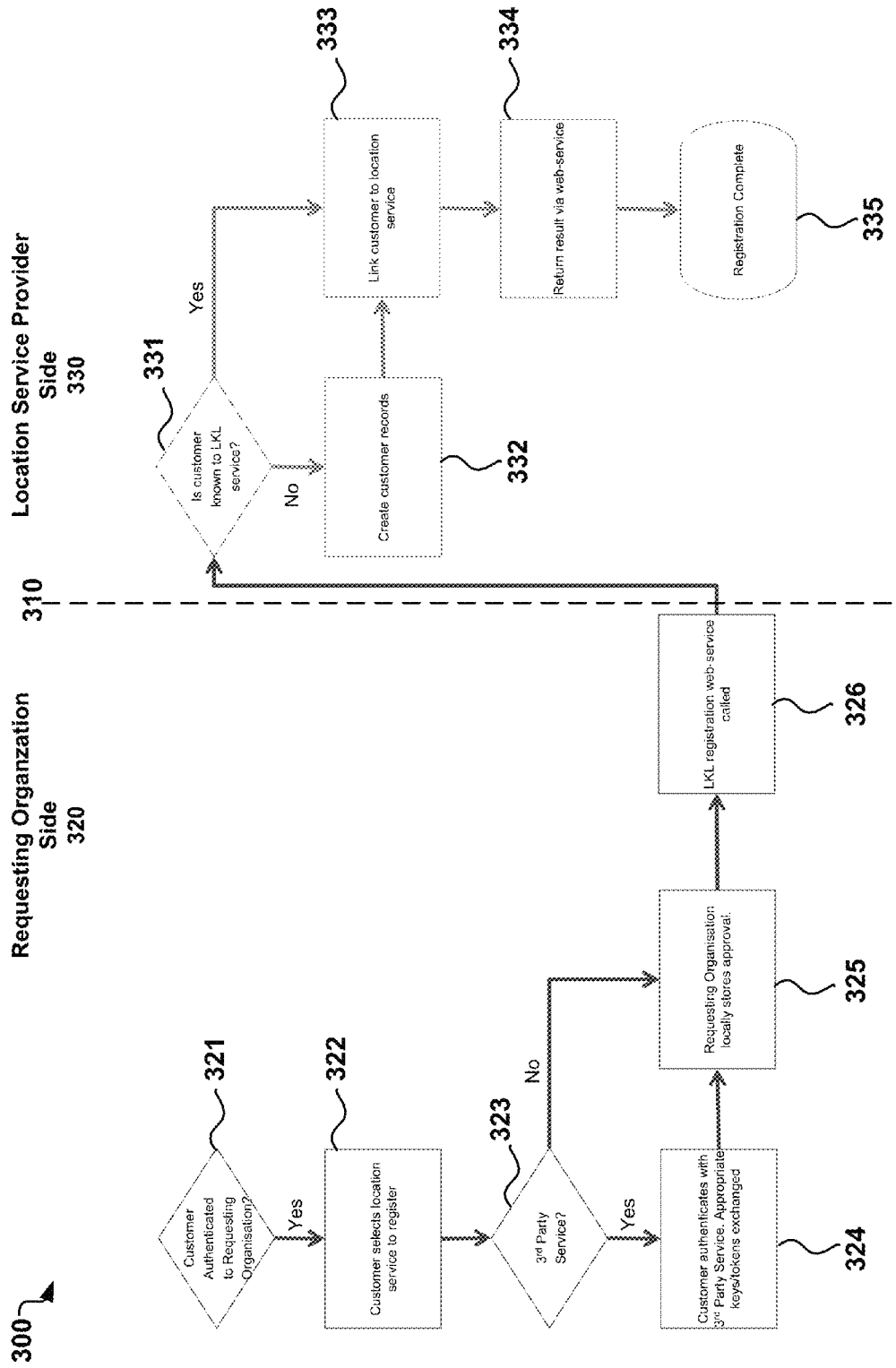
FIG. 3 is a flowchart illustrating an embodiment of a view of a method for registering a customer with a location service.

FIG. 3 is a flowchart 300 illustrating an embodiment of a view of a method for registering a customer with a location service 210.

The blocks in the illustrated flowchart are separated into two groups by a dashed line 310. The first group 320 represents processes executed by a requesting organization such as, for example, the requesting organizations 160 and 260 of FIG. 1 and FIG. 2 respectively. In various embodiments, such processes could be supported by servers or other facilities maintained and/or controlled by a requesting organization, for example, the servers 261 and 262 of FIG. 2.

The second group 330 represents services provided by a location service provider such as, for example, the customer/user registration services 150 and 215 of FIG. 1 and FIG. 2 respectively. In various embodiments, such services could be hosted by servers or other facilities maintained and/or controlled by a location service provider 330, for example, the servers 216 of FIG. 2. It is understood that, unless stated otherwise, the blocks within this group represent processing that is performed by one or more servers or other computing devices automatically, and without user intervention.

In block 321 of the method, a customer is authenticated to a requesting organization. The requesting organization can utilize any procedure it sees fit to authenticate a customer, which could include automated electronic and/or manual procedures. Electronic procedures could include, for example, processing a customer's credit card or performing a credit check. Manual procedures could include, for example, verifying a customer's identity via various types of identification credentials such as a drivers license and/or a passport.

In block 322 of the method, the customer selects a location service to use for check-in. The requesting organization can utilize any procedure it sees fit to allow a customer to select a location service, which could include automated electronic and/or manual procedures. Electronic procedures could include, for example, allowing the user to select a location service via a website of the requesting organization. Manual procedures could include, for example, obtaining a selection of a location service via a voice call to a customer service center or filling out a paper form that is mailed to the requesting organization.

In some embodiments, the customer can select multiple location services for check-in. For example, a customer could elect to check-in with a location service associated with a bank's ATMs and could also select a location service associated with a social networking website such as, for example, the TWITTER social networking site.

In block 323 of the method, it is determined if the selected location service is a third-party service. If the selected location service is a third-party service, in block 324 of the method, the customer authenticates its selection of the location service directly with the third-party service via facilities provided by the third-party service. In one embodiment, appropriate keys and tokens are exchanged between the customer and the third-party service.

In block 325 of the method, the requesting organization stores the customer approval on its local systems.

In block 326 of the method, a web-based customer registration service provided by a location service provider is then called by the requesting organization.

In one embodiment, the customer registration service can be exposed as a web-service for requesting organizations to call. In one embodiment, only authorized sources are able to call and make use of the customer registration service. For example, in one embodiment, the service only accepts either registration or de-registration instructions from a registered requesting organization. Where an RO wishes to offer this directly within a direct check-in service, the RO routes the request through their own channels and to the LKL service.

In one embodiment, parameters passed in the call to the customer registration service could include:

The requesting organization's identifier (RO-UID).

A requesting organization's customer identifier for the customer.

A location service identifier (LS-UID).

Whether to register or deregister the customer from the location service.

For the location service designated, any other data required by the location service.

In one embodiment, the requesting organization's customer identifier could be a customer identifier defined by the requesting organization, for example, a customer account number or user ID created by the requesting organization. In one embodiment, the customer identifier could be a customer identifier selected by the customer.

In one embodiment, a requesting organization could allow check-in with multiple location services, in some embodiments including multiple channels of the requesting organization and multiple third-party check-in services. For example, a bank could allow its customers to check-in via ATMs and via the TWITTER website. In one embodiment, a customer can register with multiple requesting organizations, and can provide check-in information to some or all such organizations through a single source (e.g., the TWITTER website).

In one embodiment, a requesting organization can only register a user against a location service they are authorized to access. If the registration request is a request to register or de-register for a service for which the RO is not authorized, that request is failed.

In block 331 of the method, it is determined if the customer is known to the LKL service, a new LKL identifier (LKL-USR-ID) is created for the customer and customer records associated with that LKL identifier are created for the customer within the LKL service. In one embodiment, the new LKL identifier is linked to the requesting organization's customer identifier passed in the call to the customer registration service. In one embodiment, if a new LKL identifier is created for the customer, the new LKL identifier is automatically generated by the LKL service.

In block 333 of the method, the customer, the customer is then linked to the location service within the LKL service. In one embodiment, the combination of the RO-UID and the LKL-USR-UID are associated with the LS-UID for the location service. In one embodiment, the LKL-USR-UID is further associated with the combination of the location service's LS-UID and the requesting organization's customer identifier for the customer (stored as LS-USR-ID, the location service's user ID) and is stored in a customer record for the customer.

In one embodiment, if the registration request indicates the customer is to be de-registered with the location service (not shown), the link between the RO-UID, the LKL-USR-UID and the LS-UID (the WI link) is removed. In one embodiment, if link between the RO-UID, the LKL-USR-UID and the LS-UID is removed, location information related to the LKL-USR-UID and the LS-UID can be deleted.

In block 334 of the method, the result of the registration process is returned to the requesting organization via the web-based registration. In one embodiment, the result can include the overall call status, for example, success or error. In one embodiment, the result can include a sub-status, for example, a specific error code relating to the failure, and a sub-status description providing a meaningful description of the failure, or further diagnostic information. In block 335, the method ends.

In one embodiment, customers are registered via the registration web-service; no direct entry of end-users is required. In one embodiment, the LKL console provides a customer/user inquiry that can allow systems administrators to view all appropriate static user data (i.e., the registration data) with the ability to drill-down to a specific user. In one embodiment, the ability to view more detailed information on a user, for example displaying those location services and requesting organizations linked to that user, will be accomplished by creating custom reports within the LKL service's host platform.

Direct Check-In

Figure 4:
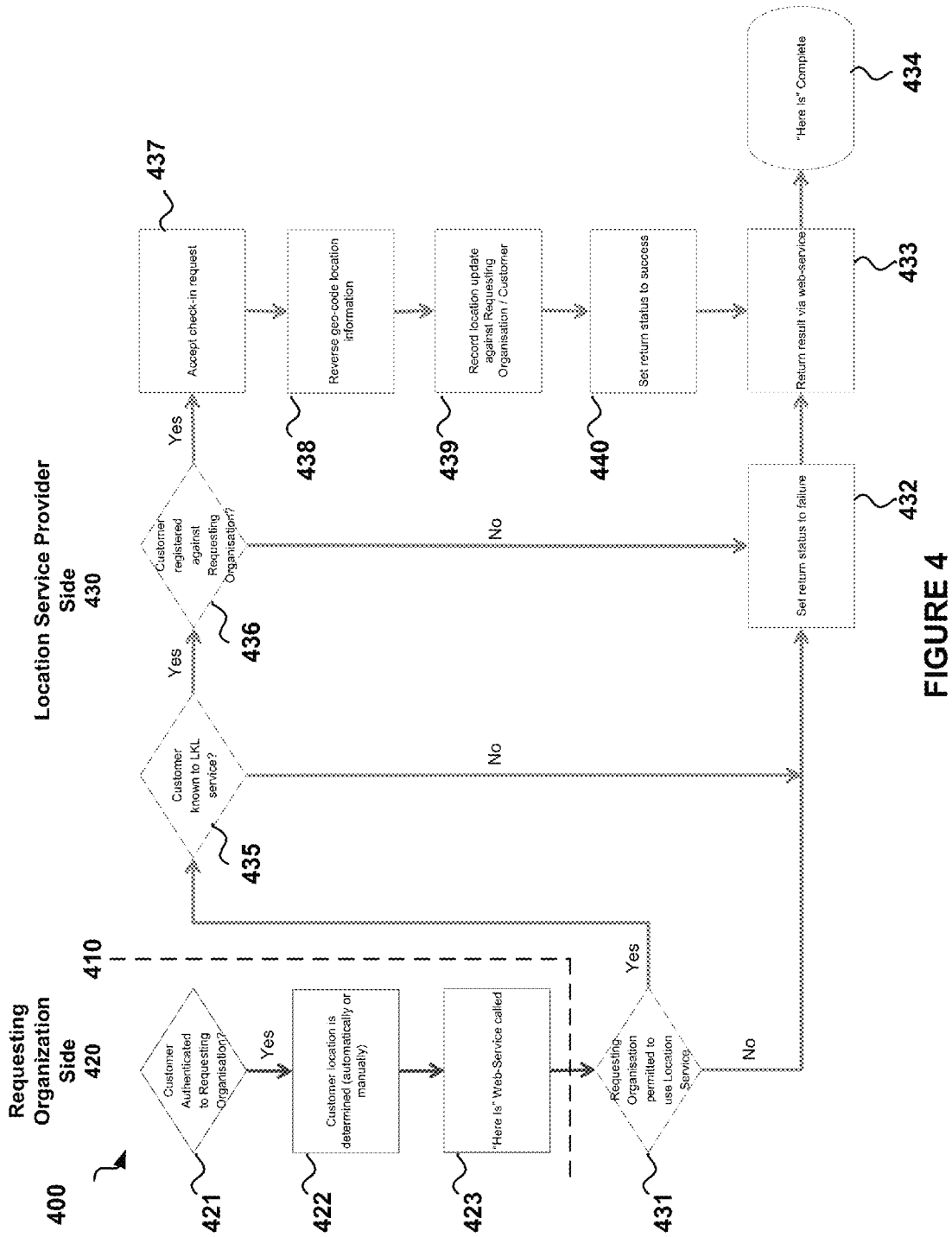
FIG. 4 is a flowchart illustrating an embodiment of a view of a method for direct check-in of a customer with a location service.

FIG. 4 is a flowchart 400 illustrating an embodiment of a view of a method for direct check-in of a customer with a location service.

The blocks in the illustrated flowchart are separated into two groups by a dashed line 410. The first group 420 represents processes executed by a requesting organization such as, for example, the requesting organizations 160 and 260 of FIG. 1 and FIG. 2 respectively. In various embodiments, such processes could be supported by servers or other facilities maintained and/or controlled by a requesting organization, for example, the servers 261 and 262 of FIG. 2.

The second group 430 represents services provided by a location service provider such as, for example, the direct check-in ("Here Is")/common check-in services 150 and 215 of FIG. 1 and FIG. 2 respectively. In various embodiments, such services could be hosted by servers or other facilities maintained and/or controlled by a location service provider, for example, the servers 212 of FIG. 2. It is understood that, unless stated otherwise, the blocks within this group represent processing that is performed by one or more servers or other computing devices automatically, and without user intervention.

In block 421 of the method, a customer who desires to check-in via a requesting organization's channel is authenticated to the requesting organization. In one embodiment, the requesting organization checks customer approvals (i.e., registrations) stored on their local systems such as, for example, those stored in block 325 of FIG. 2. If the customer is not authenticated to the requesting organization, the customer cannot check-in (not shown). In one embodiment, the customer could be a natural person or a business entity whose location can be determined. In other embodiments, the could customer can be any type of object whose location can be determined, such as, for example, an object having an RFID tag or GPS capabilities.

If the customer is authenticated to the requesting organization, in block 422 of the method, the customer's location is determined. In one embodiment, the customer's location is determined automatically. In one embodiment, the customer's location can, additionally or alternatively, be determined manually.

In block 423 of the method, a direct check-in ("Here Is") service provided via a location service is called by the requesting organization (i.e., the check-in information is "pushed" to the location service). In one embodiment, the direct check-in service is provided via a web-based API. In one embodiment, the API can require:

The requesting organizations ID (RO-UID)

An API key for a location service (RO-API-KEY). Note these are location service keys—the requesting organization has to register each of their own location services, so each will be granted an LS-ID and a unique API key.

A location service identifier (LS-UID).

The location service user identifier for the customer (LS-USR-ID), which, in one embodiment, can equate to a requesting organization's customer number for the customer.

Location information—while the LKL service can record the latitude and longitude, this information cannot be required on the check-in itself. A user can provide information ranging from country through state, region, city, and postal, as well as exact, location. The quality of the check-in can also be passed and recorded, to reflect when a user checks-in with less accurate information (e.g., a city name), and the resultant latitude and longitude recorded is a central point.

Optionally, in one embodiment the API can also accept:

Location description

In one embodiment, check-in information is not pushed to the location service, but rather, is polled periodically from channels associated with the location service.

In one embodiment, upon receipt of the check-in information, the LKL service hosting the location service can create a "Here Is" (HI) record for the combination of the customer and the location service (not shown). The data that can be stored can include:

Check-in Data:

A check-in ID generated by the LKL service.

The location service through which the check-in was made (e.g., LS-UID).

The ID and the name of the customer who made the check-in (e.g., LS-USR-ID).

Location information.

Application information about the application that made the check-in).

Created time (the time the check-in was created).

The location information can include:
- Name (the name of the place/location).
- Latitude (latitude of the location).
- Longitude (longitude of the location).

In block 431 of the method, it is determined if the requesting organization is permitted to use the location service. In one embodiment, requesting organizations are given permission to use location services when the requesting organization is registered with the LKL service, and can be granted permission to use other location services from time to time. In one embodiment, when a requesting organization is registered with the LKL service, the requesting organization is provided an API key for the access to the LKL service (e.g. registration services), and is provided a separate API key for each channel the requesting organization registers. Where the requesting organization wishes to access location data from a third-party source, the requesting organization receives the API key directly from the third-party source.

In one embodiment, the API key passed in the call to the direct check-in service is validated by the LKL service, and if invalid, the requesting organization is not permitted to use the location service. In one embodiment, if the API key is valid, the LKL service further determines if the requesting organization is active and has permission to use the location service. If the requesting organization is not active or does not have permission to use the location service, the requesting organization is not permitted to use the location service.

If the requesting organization is not permitted to use the location service, in block 432 of the method, the return status of the direct check-in service is set to failure and in block 433 of the method, the result of the call to the web-based direct check-in service is returned to the requesting organization. The method then ends in block 434.

In block 435 of the method, it is then determined if the customer is known to the LKL service. In one embodiment, the LKL service attempts to retrieve the customer record for the customer's LKL-USR-UID associated with the combination of the LS-UID and the LS-USR-ID identified in the call to the check-in service (created during the customer registration process, as discussed above). If no such record exists, the customer is not known to the LKL service.

If the customer is not known to the LKL service, in block 432 of the method, the return status of the direct check-in service is set to failure and in block 433 of the method, the result of the call to the direct check-in service is returned to the requesting organization. The method then ends in block 434.

If the customer is known to the location service, in block 436 of the method, it is determined if the customer is registered against the requesting organization with respect to the location service. In one embodiment, the LKL service attempts to retrieve the customer record for the combination of the requesting organization's user ID (RO-UID) and the LKL-USR-UID which is associated with the locations service's user ID (LS-UID)(created during the customer registration process, as discussed above). If no such record exists, the customer is not registered against the requesting organization with respect to the location service.

If the customer is not registered against the requesting organization with respect to the location service, in block 432 of the method, the return status of the direct check-in service is set to failure and in block 433 of the method, the result of the call to the direct check-in service is returned to the requesting organization. The method then ends in block 434.

if the customer is registered against requesting organization with respect to the location service, in block 437 of the method, the check-in request is accepted by the location service, and in block 438 of the method, the customer's location information received via the call to the web-based direct check-in service is reverse geo-coded. In one embodiment, reverse geo-coding comprises determining the underlying latitude and longitude of location passed in the check-in call.

In block 439 of the method, the customer's location is then used to record a customer location update (e.g., last known location) against a combination of the requesting organization and the customer within the location service, and in block 432 of the method, the return status of the web-based direct check-in service is set to success. In block 433 of the method, the result of the call to the web-based direct check-in service is returned to the requesting organization. The method then ends in block 434.

In one embodiment, the customer location update is stored as a "Here Is" (HI) record. In one embodiment, the HI record can include the customer's latitude, longitude, location information actually received via the check-in request, and, if passed, the location description. In one embodiment, the HI record can additionally include a quality level. In one embodiment, quality levels could include:

| Quality Code | Description | "Where Is Field" |
|---|---|---|
| 10 | Co-ordinate | |
| 9 | House/Building | House/Building |
| 8 | Postal Code | |
| 7 | Postal Unit | |
| 6 | Postal District | |
| 5 | Street | Street |
| 4 | City | City |
| 3 | County | County |
| 2 | State | State |
| 1 | Country | Country |

In one embodiment, the "Where Is" field relates to information that can be passed back within a reply to a user location ("Where Is") request (discussed below). In one embodiment, the information returned in the reply is dependent upon the quality of the original check-in: no field with a quality code higher than the quality of the check-in can be returned.

For example, if the check-in quality was "5", then the Street, City, County, State and Country fields can be returned. If the check-in quality was "2", then only the State and Country fields can be returned. House/building cannot always be available via geo-coding services. Note that in various embodiments, postal code, postal unit or postal district cannot be stored within an LKL service. In such case, if a check-in was provided with a quality of 6, 7 or 8, only "Where Is" fields with a quality of 5 or below can be returned. In one embodiment, co-ordinate is always returned as the prime indicator of location, regardless of the quality of the check-in.

Indirect (Third-Party) Check-In

Figure 5:
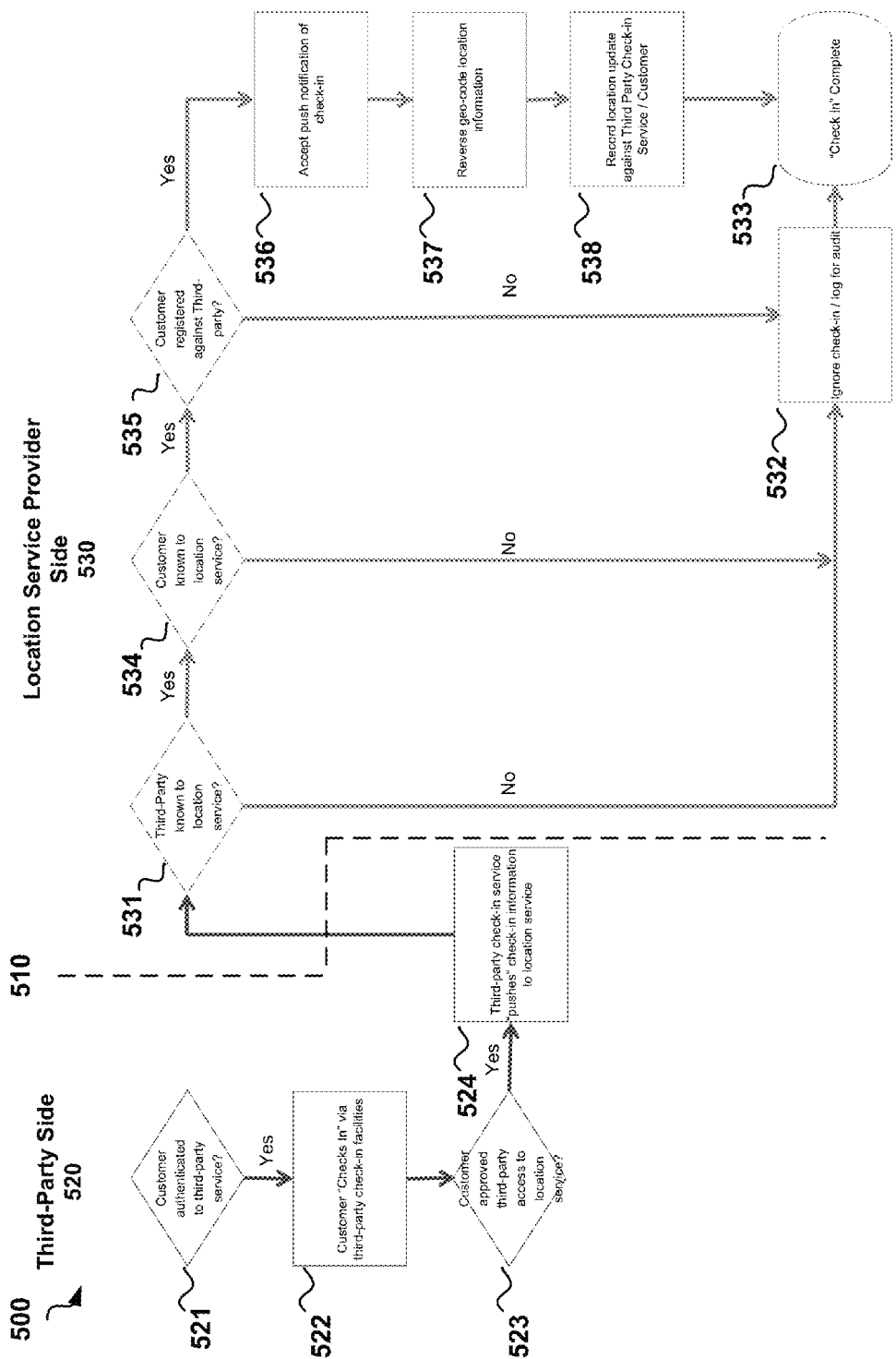
FIG. 5 is a flowchart illustrating an embodiment of a view of a method for indirect (third-party) check-in of a customer with a location service.

FIG. 5 is a flowchart 500 illustrating an embodiment of a view of a method for indirect (third-party) check-in of a customer with a location service.

The blocks in the illustrated flowchart are separated into two groups by a dashed line 510. The first group 520 represents processes executed by third-party channels such as, for example, the channels 121-128 and 221-228 of FIG. 1 and FIG. 2 respectively. In various embodiments, such processes could be supported by servers or other facilities maintained and/or controlled by such third parties, for example, the servers 230 of FIG. 2.

The second group 530 represents services provided by a location service provider such as, for example, the third-party check-in services 120 and 214 of FIG. 1 and FIG. 2 respectively. In various embodiments, such services could be hosted by servers or other facilities maintained and/or controlled by a location service provider, for example, the servers 212 of FIG. 2. It is understood that, unless stated otherwise, the blocks within this group represent processing that is performed by one or more servers or other computing devices automatically, and without user intervention.

In block 521 of the method, a customer who desires to check-in via a third-party check-in service is authenticated to the third-party service. In one embodiment, the third-party authenticates the customer user using a key and/or tokens created when the customer registered with the third-party service as, for example, in block 324 of FIG. 3. If the customer is not authenticated to the third-party service, the customer cannot check-in (not shown). In one embodiment, the customer could be a natural person or a business entity whose location can be determined. In other embodiments, the could customer can be any type of object whose location can be determined, such as, for example, an object having an RFID tag or GPS capabilities.

If the customer is authenticated to the third-party check-in service, in block 522 of the method, the customer checks-in using facilities provided by the third-party service. Such facilities could provide various means for the customer to input and describe the customer's current location. In one embodiment, the third-party check-in service could provide a form via its user interface for the entry of check-in information, and the customer can manually enter the customer's location using the form. In one embodiment, if the location of a customer device being used for check-in can be determined automatically, for example via the device's GPS or other geolocation capabilities, the customer's location could be automatically entered into a check-in form. In one embodiment, if the location of a customer device being used for check-in can be determined automatically, the customer can be checked-in automatically and without user intervention, every time the customer logs into the web-based service supporting the third-party check-in service. In one embodiment, the third-party check-in service provides freeform text entry capabilities and a customer can enter his or her location as a freeform text message. For example, if a user is using the TWITTER website, the user could enter his or her location as a TWEET.

In block 523 of the method, it is then determined if one or more location services should receive all or part of the check-in information provided by the customer, based upon whether the customer has authorized such location services to the third-party check-in service. If the customer has not authorized any location services to the third-party check-in service, the check-in is ignored by the third-party check-in service (not shown).

If the customer has approved one or more location services to the third-party check-in service, in block 524 of the method, the third-party check-in service "pushes" check-in information to the location service. In one embodiment, the direct check-in service is provided via a web-based API similar to, or identical to, the direct check-in service as described above with respect to block 423 of FIG. 4. In one embodiment, the check-in service is provided via a web-based API dedicated to the third-party check-in service.

In one embodiment, the pushed check-in information does not include location information, and the location information relating to the check-in is pulled from the third-party service by the location service (not shown). In one embodiment, check-in information is not pushed to the location service, but rather is polled periodically from third-party services associated with the location service (not shown).

In one embodiment, upon receipt of the check-in information, the LKL service hosting the location service can create a "Here Is" (HI) record for the combination of the customer and the location service as described above with respect to block 423 of FIG. 4. (not shown).

In block 531 of the method, it is determined if the third-party check-in service is known to and has therefore been registered with the location service. In one embodiment, third-party services are given permission to use location services when the third-party service is registered with the LKL service. In one embodiment, when a requesting organization is registered with the LKL service, the requesting organization is provided an API key for the LKL service. In one embodiment the requesting organization may register a single check-in method through which all channels will provide location information for customers. In one embodiment the requesting organization may register a check-in method per channel. An API key is generated for the requesting organization to use against each check-in method registered.

In one embodiment, the API key passed in the call to the third-party check-in service is validated by the LKL service, and if invalid, the third-party service is not permitted to use the location service. In one embodiment, if the API key is valid, the LKL service further determines if the third-party service is active and is has permission to use the location service. If the third-party service is not active or does not have permission to use the location service, the requesting organization is not permitted to use the location service.

If the third-party check-in service is not known to the location service, in block 532, the attempted check-in is logged for audit purposes, but otherwise ignored. The method then ends in block 533.

If the third-party check-in service is known to the location service, in block 534 of the method, it is determined if the customer is known to the location service. In one embodiment, the LKL service attempts to retrieve the customer record for the customer's LKL-USR-UID associated with the combination of the LS-UID and the LS-USR-ID identified in the call to the check-in service (created during the customer registration process, as discussed above). If no such record exists, the customer is not known to the LKL service.

If the customer is not known to the location service, in block 532, the attempted check-in is logged for audit purposes, but otherwise ignored. The method then ends in block 533.

If it is determined that the customer is known to the location service, in block 535 of the method, it is then determined in block 538 of the method if the customer is registered against the third-party check-in service within the location service. In one embodiment, the LKL service attempts to retrieve the customer record for the combination of the third party's user ID (RO-UID) and the LKL-USR-UID which is associated with the locations service's user ID (LS-UID) (created during the customer registration process, as discussed above). If no such record exists, the customer is not registered against the third-party service with respect to the location service.

If the customer is not registered against the third-party check-in service within the location service, in block 532, the attempted check-in is logged for audit purposes, but otherwise ignored. The method then ends in block 533.

If the customer is registered against the third-party check-in service within the location service, in block 536 of the method, the push notification of the customer check-in is accepted, and in block 537 of the method, the customer's location information received via the push notification of the customer check-in is reverse geo-coded. In one embodiment, reverse geo-coding comprises determining the underlying latitude and longitude of location passed in the check-in call. In block 538 of the method, the customer's location is then used to record a customer location update (e.g., last known location) against a combination of the third-party check-in service and the customer within the location service. In one embodiment, the customer location update is stored as a "Here Is" (HI) record as described above with respect to block 439 of FIG. 4. The method then ends in block 533.

Customer/User Location Requests ("Where Is")

Figure 6:
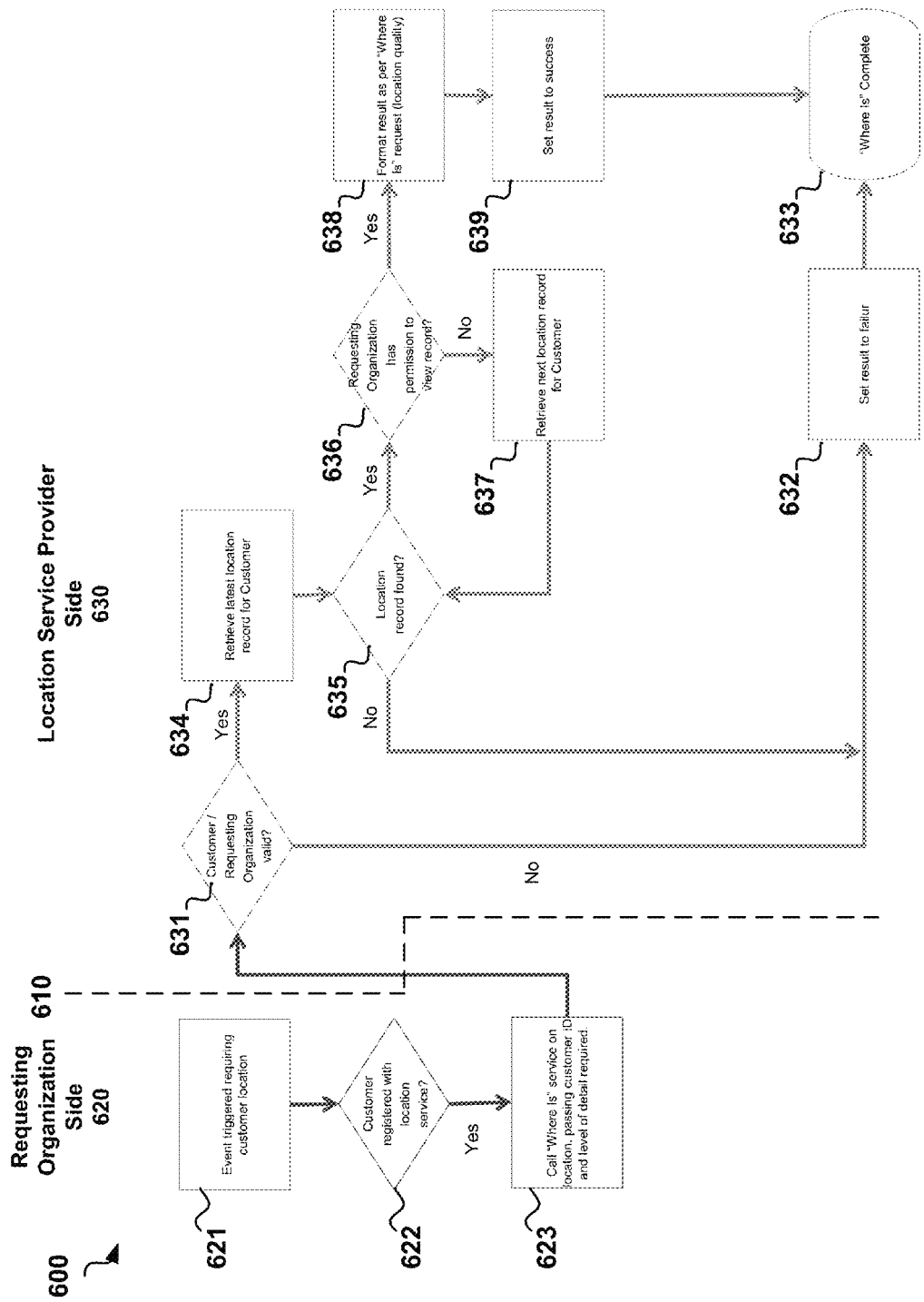
FIG. 6 is a flowchart illustrating an embodiment of a view of a method for processing a user location ("Where Is") request from a requesting organization by a location service.

FIG. 6 is a flowchart 600 illustrating an embodiment of a view of a method for processing a user location ("Where Is") request from a requesting organization by a location service.

The blocks in the illustrated flowchart are separated into two groups by a dashed line 610. The first group 620 represents processes executed by a requesting organization such as, for example, the requesting organizations 160 and 260 of FIG. 1 and FIG. 2 respectively. In various embodiments, such processes could be supported by servers or other facilities maintained and/or controlled by a requesting organization, for example, the servers 261 and 262 of FIG. 2.

The second group 630 represents services provided by a location service provider such as, for example, the user location ("Where Is") services 140 and 217 of FIG. 1 and FIG. 2 respectively. In various embodiments, such services could be hosted by servers or other facilities maintained and/or controlled by a location service provider, for example, the servers 218 of FIG. 2. It is understood that, unless stated otherwise, the blocks within this group represent processing that is performed by one or more servers or other computing devices automatically, and without user intervention.

In block 621 of the method, an event is triggered that requires a customer's location. Such events could include, for example, a financial or purchase transaction initiated by a customer such as, without limitation, an ATM withdrawal or a credit card purchase. In one embodiment, such an event could be detected via any means the requesting organization has to receive or track such events, including user channels such as, without limitation, web-based channels (e.g., the requesting organization's), apps hosted on customer devices (e.g., smart phone type devices), ATMs, POS terminals and/or any other services offered by the requesting organization.

In block 622 of the method, it is then determined if the customer is registered with a location service. In one embodiment, the requesting organization checks customer approvals (i.e., registrations) stored on their local systems such as, for example, those stored in block 325 of FIG. 2. If the customer is not registered with the location service, the requesting organization can respond accordingly according to its own procedures. For example, a retail transaction that requires the customer's last known location could be rejected if it is determined the customer is not registered with a location service.

If the customer is registered with a location service in block 623 of the method, in block 631 of the method, the requesting organization issues a call to a customer location ("Where Is") service provided by the LKL service. In one embodiment, the customer location service is called via a web-based API. In one embodiment, the web-based API passes a set of parameters, which can include:

RO-UID The requesting organization's ID.

RO-API-KEY An API key granting the requesting organization access to the LKL service.

WHEREIS-UID A unique identifier for this request generated by the requesting organization.

RO-WHEREIS-USER A user ID identifying the user for which the location is required which could comprise:

RO-USR-UID The requesting organization's identifier for the customer provided to the LKL service during user registration.

RO-WHEREIS-FLAGS Additional data that the requesting organization requires to be returned within the response which could comprise:

An "A" flag, whereby the requesting organization requests as much address detail as can be provided in the response (e.g., highest quality level).

A quality flag, whereby the requesting organization requests location data at a designated quality level (note: if available quality level is below the requested quality level, the highest quality data is returned.

In block 631 of the method, it is determined if the customer and the requesting organization are valid. In one embodiment, requesting organizations are given permission to use location services when the requesting organization is registered with the LKL service, and may be granted permission to use other location services from time to time. In one embodiment, when a requesting organization is registered with the LKL service, the requesting organization is provided an API key. In one embodiment, the API key passed in the call to the direct check-in service is validated by the LKL service, and if invalid, the requesting organization is not valid. In one embodiment, if the API key is valid, the LKL service further determines if the requesting organization is active. If the requesting organization is not active, the requesting organization is not valid.

In one embodiment, if the customer (RO-WHEREIS-USER) is not registered with the LKL service, the customer is not valid. In one embodiment, if the customer is not registered against the requesting organization, the customer is not valid.

If the customer and the requesting organization are not valid, in block 632 of the method, the return status of the web-based customer location service is set to failure and the result of the call to the web-based customer location service is returned to the requesting organization. The method then ends in block 633.

If the customer and the requesting organization are valid, in block 634 of the method, the latest location record is retrieved for the customer. In one embodiment, location records comprise HI ("Here Is") records logged by direct and indirect check-in functions as described above. Note the retrieved location record may have originated from any location service with which the user is registered, and may have been stored in response to a user check-in via any check-in service regardless of the requesting organization.

In block 635 of the method, it is determined if a location record was found for the customer. If no location records are found for the customer, in block 632 of the method, the return status of the web-based customer location service is set to failure and the result of the call to the web-based customer location service is returned to the requesting organization. The method then ends in block 633.

If a location record is found for the customer, in block 636 of the method, it is then determined if the requesting organization has permission to view the location record. In one embodiment, as records are retrieved for a user ID (RO-USR-UID), the retrieved location records will typically correspond to either records from check-ins by the customer via one of the requesting organization's channels, or from check-ins by the customer via a third-party service which are directed to the requesting organization. Nevertheless it is possible that user IDs for customer could be duplicated between different requesting organizations for the same customer and possibly between different requesting organizations for the different customers.

In one embodiment, the requesting organization has permission to view the location record if the customer in the location record (LS-UID) is registered against the combination of the requesting organization and the location service. In one embodiment, it can be determined if the customer in the location record is registered against the combination of the requesting organization and the location service using data from the location record as follows. First the LKL-USR-UID for the customer associated with the location record is determined using the LS-UID (the location service ID) and the LS-USR-ID (corresponding to the RO-USR-UID in the API call). Then using the LKL-USR-UID, it is determined if the combination of the requesting organization (the RO-UID in the API call) and the LKL-USR-UID is associated with the location service (the LS-UID in the location record) in a WI ("Where Is") link. If such an association exists, the customer in the location record is registered against the combination of the requesting organization and the location service.

If the requesting organization does not have permission to view the location record, in block 637 of the method, the next location record is retrieved. Blocks 635, 636 and 637 are repeated until a location record is found that the requesting organization has permission to view or until no more location records for the customer remain. If no location records are found that the requesting organization has permission to view, in block 632 of the method, the return status of the customer location service is set to failure and the result of the call to the web-based customer location service is returned to the requesting organization. The method then ends in block 633.

If a location record is found that the requesting organization has permission to view, in block 638 of the method, a result is formatted as per the customer location ("Where Is") request at the level of detail (location quality) requested. In one embodiment, the response can include:

LKL-WHEREIS-STATUS A status to indicate success

LKL-WHEREIS-UID Unique identifier from the LKL service for this response.

RO-WHEREIS-UID The requesting organization's message identifier passed in the initial call.

RO-WHEREIS-USER The user identifier passed by the requesting organization in the initial call.

LKL-WHEREIS-LS The LS-EXTERNAL-NAME identifying the location service that has provided the location within LKL-WHEREIS-LOCATION.

LKL-WHEREIS-LOCATION The information returned from the HI record, based upon the latitude and longitude recorded by the user, but also those additional elements as specified within RO-WHEREIS-FLAGS. If full address detail is required, those fields relevant for the level of check-in quality can be returned.

LKL-WHEREIS-DATETIME The date and time of customer's check-in, as included within the HI record.

LKL-WHEREIS-QUALITY A numeric identifier detailing how accurate the check-in provided by the user was (see above).

LKL-WHEREIS-DESCRIPTION If available from the location (HI) record, the location information returned can also include the location description.

LKL-WHEREIS-VELOCITY The "speed" the user has traveled between the previous check-in and the current check-in, and may be used by the RO to help determine whether it can "trust" the check-in information (see below). It can include:

LKL-VELOCITY-RANK A rank or score for the velocity such as the VELOCITY-SCORE discussed below.

LKL-VELOCITY-DISTANCE The distance between the previous check-in and the current check-in.

LKL-VELOCITY-TIME The time between the previous check-in and the current check-in.

In one embodiment, check-in velocity can be used by a requesting organization to assist them in judging whether check-in data provided by the user can be trusted. It essentially scores the check-in by calculating a value based upon:

Distance traveled.

Maximum possible speed for journey.

Elapsed time for journey.

In one embodiment, to determine the velocity, previous check-in information for the user as well as the current check-in information is used. In one embodiment, the most current check-in for the customer could be from a location service that the combination of the requesting organization and the customer are not registered against. In such case, check-in information used in velocity calculations can be the most recent prior check-in the requesting organization has permission to view, and the most recent check-in the requesting organization has permission to view.

For example, if a customer checks in, in sequence, first with location service A (location 1), then location service B (location 2), then location service A (location 3), then location service B (location 4). If the requesting organization only has permission to retrieve location information for location service A, the most recent check-in would be location 3, and the prior check-in for velocity calculations would be location 1.

In one embodiment, having both the current check-in data as well as the appropriate previous check-in data (and if there is no previous check-in data, then all returned values within the velocity section can be zero), the required information to calculate the velocity score is as follows:

VELOCITY-DISTANCE The distance between the two check-ins in miles or kilometers.

VELOCITY-ELAPSED The time, in hours (to two decimal places), between the two check-ins.

VELOCITY-MAXSPEED The maximum speed that the requesting organization considers can be achieved for the distance traveled. In one embodiment, this is derived from the RO-MAXSPEED array, shown below, based upon VELOCITY-DISTANCE.

In one embodiment, the underlying score determined as follows:

$$\text{VELOCITY-SCORE} = (\text{VELOCITY-DISTANCE}/\text{VELOCITY-MAXSPEED})/\text{VELOCITY-ELAPSED}$$

For Example, if the RO-MAXSPEED array is:

| Minimum Distance | MaxSpeed |
|---|---|
| 0 | 50 |
| 10 | 100 |
| 250 | 250 |
| 500 | 1000 | and if the customer has traveled 37 kilometers in 25 minutes (0.41 hours), then:

VELOCITY-SCORE=(37/100/0.41)

This would give a velocity score of 0.9. In one embodiment, any check-in with a velocity of one or less can be trusted by the requesting organization.

In block 639 of the method, the return status of the web-based customer location service is set to success and the result of the call to the web-based customer location service is returned to the requesting organization. The method then ends in block 633.

Figure 7:
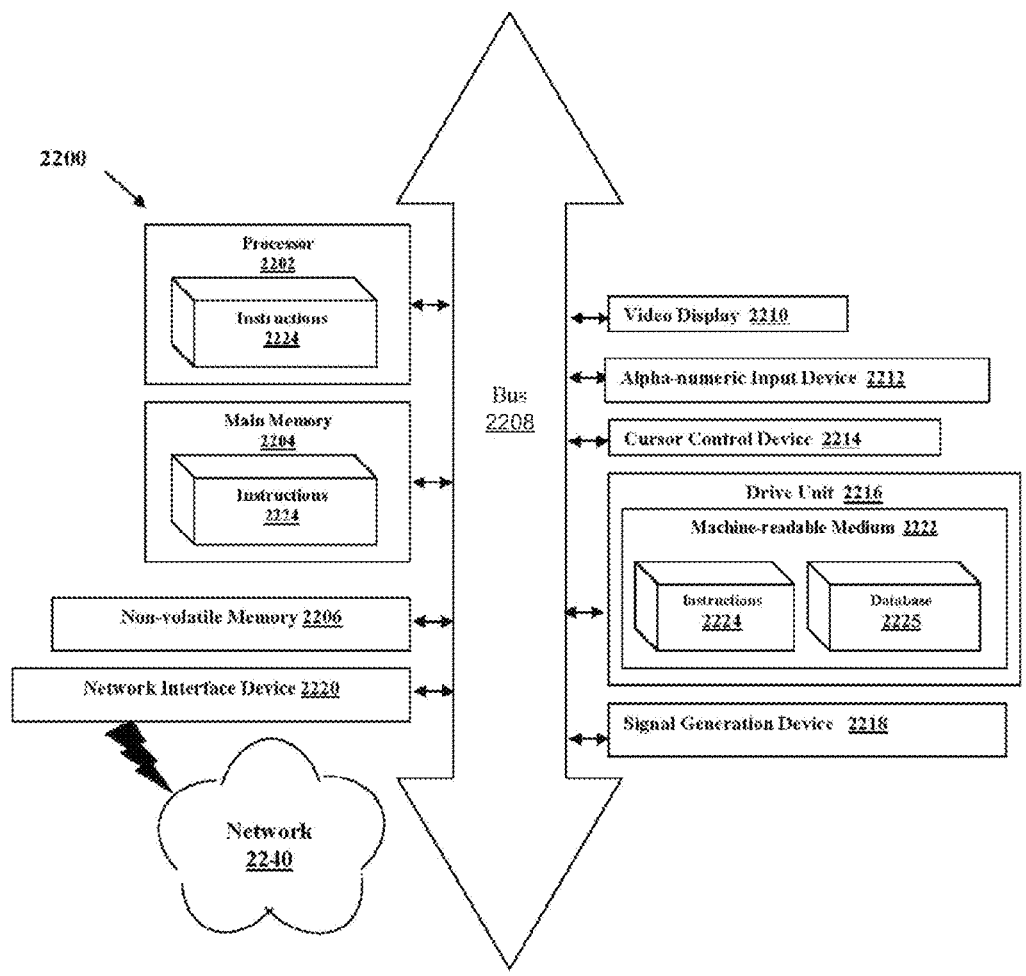
FIG. 7 is a diagrammatic representation of an embodiment of a machine 2200, within which a set of instructions for causing the machine to perform one or more of the methodologies discussed herein can be executed.

FIG. 7 is a diagrammatic representation of an embodiment of a machine 2200, within which a set of instructions for causing the machine to perform one or more of the methodologies discussed herein can be executed. The machine can be connected (e.g., networked) to other machines. In a networked deployment, the machine can operate in the capacity of a server or a client machine in a client-server network environment, or as a peer machine in a peer-to-peer (or distributed) network environment. In one embodiment, the machine communicates with the server to facilitate operations of the server and/or to access the operations of the server.

In one embodiment, the machine 2200 is a component of the LKL service servers 212, 214, 216 and 218 of FIG. 2 according to an embodiment as described herein. In one embodiment, the machine 2200 is a component of the channel servers 250 of FIG. 2. In one embodiment, the machine 2200 is a component of the channel third-party servers 250 of FIG. 2.

The machine 2200 includes a processor 2202 (e.g., a central processing unit (CPU), a graphics processing unit (GPU), or both), a main memory 2204 and a nonvolatile memory 2206, which communicate with each other via a bus 2208. In some embodiments, the machine 2200 can be a desktop computer, a laptop computer, personal digital assistant (PDA), or mobile phone, for example. In one embodiment, the machine 2200 also includes a video display 2210, an alphanumeric input device 2212 (e.g., a keyboard), a cursor control device 2214 (e.g., a mouse), a drive unit 2216, a signal generation device 2218 (e.g., a speaker) and a network interface device 2220.

In one embodiment, the video display 2210 includes a touch sensitive screen for user input. In one embodiment, the touch sensitive screen is used instead of a keyboard and mouse. The disk drive unit 2216 includes a machine-readable medium 2222 on which is stored one or more sets of instructions 2224 (e.g., software) embodying any one or more of the methodologies or functions described herein. The instructions 2224 can also reside, completely or at least partially, within the main memory 2204 and/or within the processor 2202 during execution thereof by the computer system 2200, the main memory 2204 and the processor 2202 also including machine-readable media. The instructions 2224 can further be transmitted or received over a network 2240 via the network interface device 2220. In some embodiments, the machine-readable medium 2222 also includes a database 2225.

While the machine-readable medium 2222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

In general, the routines executed to implement the embodiments of the disclosure can be implemented as part of an operating system or a specific application, component, program, object, module or sequence of instructions referred to as "programs". For example, one or more programs can be used to execute specific processes described herein. The programs typically comprise one or more instructions set at various times in various memory and storage devices in the machine and that, when read and executed by one or more processors, cause the machine to perform operations to execute elements involving the various aspects of the disclosure.

Moreover, while embodiments have been described fully in the context of machines, those skilled in the art will appreciate that the various embodiments are capable of being distributed as a program product in a variety of forms, and that the disclosure applies equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

What is claimed is:
1. A method comprising:
receiving, via a computing device, a first check-in for a user from a first check-in source, wherein the first check-in comprises an identification of the user, an identification of the first check-in source and a first set of location data relating to the user, the first set of location data based on at least one of an RFID tag, GPS capabilities, a check-in service provided by a social networking website, and a post published on a social networking website;

receiving, via the computing device, a request from a server associated with a requesting organization for location record information associated with the user, wherein the request comprises an identification of the requesting organization and the identification of the user, wherein the first check-in source is a channel offered by the requesting organization, the first check-in source including at least one of a website, a mobile terminal, an ATM, and a POS terminal, the request provided to a location service associated with the computing device and based on a name of the location service, URL endpoints for the location service, and an API key associated with the requesting organization for accessing the location service;

verifying, via the computing device, that the requesting organization is permitted to receive location data relating to the user and the first check-in source, wherein the verifying is based on the API key to allow access to the location data;

calculating a velocity for the user based at least in part on the first set of location data and a first date and time the first check-in was received from the first check-in source and a second set of location data and a second date and time a second check-in was received from a second check-in source; and in response to verifying that the requesting organization is permitted to receive the location record information associated with the user, transmitting, via the computing device, a response comprising the first set of location data the first date and time reflecting the date and time the first check-in was received, and the velocity;

wherein the velocity is used to identify a fraudulent transaction initiated at the second check-in source, the second check-in source including at least one of a website, a mobile terminal, an ATM, and a POS terminal, and wherein the first check-in source, the second check-in source, the server associated with the requesting organization, and the computing device are in remote networked communication.

2. The method of claim 1 wherein if the requesting organization is not permitted to receive location data relating to the user and the first check-in source, transmitting, via the computing device, a response comprising an indication the request has failed.

3. The method of claim 1 wherein the identification of the user comprises an identification assigned to the user by the requesting organization.

4. The method of claim 1 wherein the first check-in source is a third-party web-based service.

5. The method of claim 4 wherein the third-party web-based service is a third-party website.

6. The method of claim 5 wherein the third-party web-based service is a social networking website.

7. The method of claim 1 wherein the first set of location data comprises a first geospatial location at a first quality level reflecting a first precision of the first geospatial location, wherein the response additionally comprises the first quality level.

8. The method of claim 7 wherein the request additionally comprises a requested quality level reflecting a precision of location data desired by the requesting organization, wherein if the requested quality level is greater than the first quality level, the first location data is provided in the response at the first quality level, and if the requested quality level is not greater than the first quality level, the first location data is provided in the response at the requested quality level.

9. A system comprising
a processor; and
a storage medium for tangibly storing thereon program logic for execution by the processor, the program logic comprising:

logic executed by the processor for receiving a first check-in for a user from a first check-in source, wherein the first check-in comprises an identification of the user, an identification of the first check-in source and a first set of location data relating to the user, the first set of location data based on at least one of an RFID tag, GPS capabilities, a check-in service provided by a social networking website, and a post published on a social networking website;

logic executed by the processor for receiving a request from a server associated with a requesting organization for location record information associated with the user, wherein the request comprises an identification of the requesting organization and the identification of the user, wherein the first check-in source is a channel offered by the requesting organization, the first check-in source including at least one of a website, a mobile terminal, an ATM, and a POS terminal, the request provided to a location service associated with the computing device and based on a name of the location service, URL endpoints for the location service, and an API key associated with the requesting organization for accessing the location service;

logic executed by the processor for verifying that the requesting organization is permitted to receive location data relating to the user and the first check-in source, wherein the verifying is based on the API key to allow access to the location data;

logic executed by the processor for calculating a velocity for the user based at least in part on the first set of location data and a first date and time the first check-in was received from the first check-in source and a second set of location data and a second date and time a second check-in was received from a second check-in source; and logic executed by the processor for, in response to verifying that the requesting organization is permitted to receive location record information associated with the user, transmitting a response comprising the first set of location data the first date and time reflecting the date and time the first check-in was received, and the velocity;

wherein the velocity is used to identify a fraudulent transaction initiated at the second check-in source, the second check-in source including at least one of a website, a mobile terminal, an ATM, and a POS terminal, and wherein the first check-in source, the second check-in source, the server associated with the requesting organization, and the computing device are in remote networked communication.

10. A non-transitory machine-readable storage media that provides instructions for a processor, which when executed by the processor cause the processor to perform a method comprising:

receiving a first check-in for a user from a first check-in source, wherein the first check-in comprises an identification of the user, an identification of the first check-in source and a first set of location data relating to the user, the first set of location data based on at least one of an RFID tag, GPS capabilities, a check-in service provided by a social networking website, and a post published on a social networking website;

receiving a request from a server associated with a requesting organization for location record information associated with the user, wherein the request comprises an identification of the requesting organization and the identification of the user, wherein the first check-in source is a channel offered by the requesting organization, the first check-in source including at least one of a website, a mobile terminal, an ATM, and a POS terminal, the request provided to a location service associated with the computing device and based on a name of the location service, URL endpoints for the location service, and an API key associated with the requesting organization for accessing the location service;

verifying that the requesting organization is permitted to receive location data relating to the user and the first check-in source, wherein the verifying is based on the API key to allow access to the location data;

calculating a velocity for the user based at least in part on the first set of location data and a first date and time the first check-in was received from the first check-in source and a second set of location data and a second date and time a second check-in was received from a second check-in source; and in response to verifying that the requesting organization is permitted to receive location record information associated with the user, transmitting a response comprising the first set of location the first date and time reflecting the date and time the first check-in was received, and the velocity;

wherein the velocity, is used to identify a fraudulent transaction initiated at the second check-in source, the second check-in source including at least one of a web site, a mobile terminal, an ATM, and a POS terminal, and wherein the first check-in source, the second check-in source, the server associated with the requesting organization, and the computing device are in remote networked communication.

* * * * *